Patented July 24, 1923.

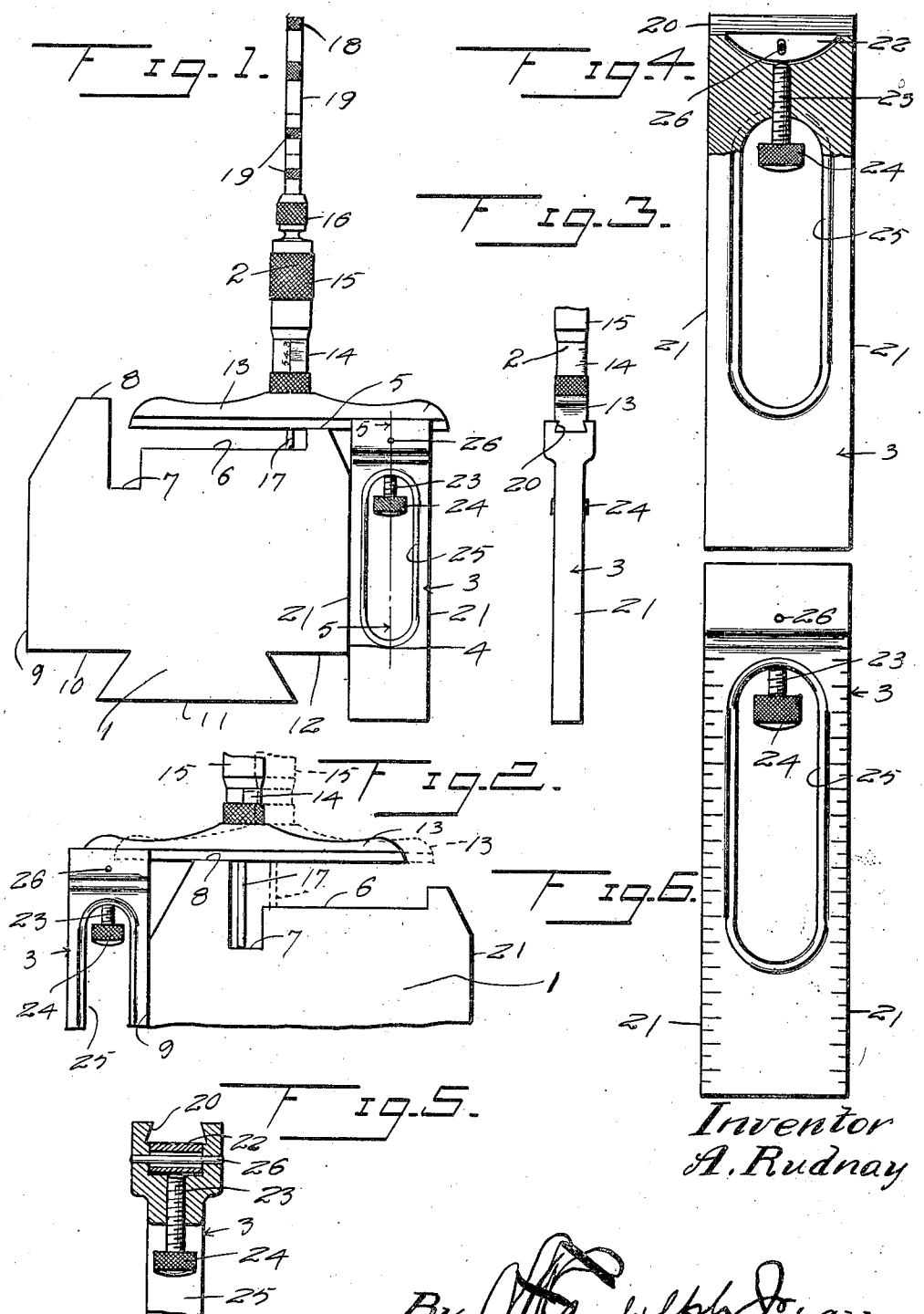

1,463,095

UNITED STATES PATENT OFFICE.

ANDREW RUDNAY, OF BUFFALO, NEW YORK.

MICROMETER ATTACHMENT.

Application filed February 20, 1920. Serial No. 360,252.

*To all whom it may concern:*

Be it known that I, ANDREW RUDNAY, a citizen of the United States, residing at Buffalo, in the county of Erie and State of New York, have invented certain new and useful Improvements in Micrometer Attachments; and I do hereby declare the following to be a full, clear, and exact description of the invention, such as will enable others skilled in the art to which it appertains to make and use the same.

This invention relates to a micrometer and more especially to an attachment for an instrument of the character mentioned and adapted for use in the measurement of depths of cavities or the like and may be referred to as a micrometer depth gage.

An object being to provide an attachment adapted to be applied to said form of tool to facilitate its use in making measurements in an accurate manner that would be impossible without the attachment.

A further object is to provide a simple, durable and inexpensive attachment that may be quickly attached to or removed from the micrometer.

Another object is to provide an attachment that in its application to the micrometer will require no changes that will to the slightest degree interfere with the operation of the micrometer as used without said attachment.

Furthermore an attachment is provided that will not in any way diminish the accuracy or damage the micrometer in its use on said instrument.

These and other objects are attained by such novel features of construction and arrangement of parts as will be hereinafter more fully described, illustrated in the accompanying drawing and finally claimed.

Reference will be had to the drawing wherein like characters designate corresponding parts throughout the views, in which:

Figure 1 is an elevation of a depth micrometer with the attachment applied and shown when used in making a measurement on a block having an irregular outer surface.

Figure 2 is a similar view of the instrument shown in full lines as applied to the block when making another measurement and in dotted lines when making the third measurement.

Figure 3 is an edge view of the micrometer with the attachment applied.

Figure 4 is a detail elevation showing parts in section.

Figure 5 is a section on line 5—5 of Figure 1.

Figure 6 is a detail view showing a slightly modified form of attachment having graduation along its edge.

Referring more particularly to the drawings by numerals 1 indicates a block of work having an irregular surface, from which, for the purpose of illustrating the manner of use of the invention, it is desired to take measurements. 2 is a depth micrometer to which the attachment 3 is connected.

A block 1 is shown as having the several surfaces 4—5—6—7—8—9—10—11 and 12 from which measurements are to be made for instance in duplicating the block or ascertaining its said surfaces or for machining to the proper measurement.

The depth micrometer 2 is provided with the usual straight edge 13 in which is mounted and which extends perpendicularly therefrom the graduated sleeve 14 over which operates the rotary micrometer adjusting nut 15 at the outer end of which is a clamp or lock nut 16 adapted to secure the micrometer measuring post 17 to the rotary nut 15. The post 17 extends beyond the clamp nut and is provided at its outer end with a head 18 and between said head 18 and lock nut 16 are spacing sleeves 19 accurately cut to, for instance, one and one-half inch lengths, which provide for the long adjustment of the post, while the micrometer adjustment is provided for by the rotary micrometer nut 15.

All of the above parts are of well known construction and form no part of the invention, the present invention relating to an attachment which when applied thereto will provide the same with means for procuring accurate measurements that are impossible without the use of said attachment.

The attachment as seen at 3 consists of an arm secured by a dove tailed joint as shown at 20, on the straight edge or cross arm 13 of the micrometer and on which it is adapted to be adjusted.

The attachment arm 3 is adapted to extend with its inner edge at a true right angle or at an angle at 90° to the straight edge of the micrometer and is preferably made interchangeable by being provided with parallel edges 21—21.

To securely lock the arm 3 in its adjusted position on the micrometer, a clamping shoe 22 is loosely seated in the end of the arm 3 and is adapted to be forced into contact with the face of the arm 13 of the micrometer by a thumb screw 23, threaded through the end of the arm 3 with its knurled head 24 arranged in a cut away portion 25 in the arm 3.

A pin 26 is loosely mounted in the clamping shoe 22, to prevent its falling from the arm when the same is not in use and the shoe 22 is preferably the full width of the surface of arm 13 and is elongated to provide a surface that will not damage the true surface of the micrometer arm 13.

By reference to Figures 1 and 2 it will be seen that a measurement between the surfaces 5 and 6 could not be accurately made by the depth micrometer shown without aid of the attachment 3, owing to the reason that due to the single surface 5 on which the instrument must rest, said surface being of such limited area, it would be impossible to hold the micrometer sufficiently steady to prevent rocking on the surface 5 which would necessarily make an accurate measurement impossible. It may be further stated that in making measurements of this character, the surface corresponding to that shown at 5 is located toward the end of the arm 13 making greater the difficulty in procuring accurate measurement.

The arm 3 is mounted on the straight edge 13 and its edge 21 brought into contact with the surface 4 of the block the measurements are made absolutely accurate and by adjustment of the parts, measurements along the surface 6 may be made, all of which will be accurate, as relates to the relative distance said surface at the several points is, from a line forming a continuation of the surface 5.

By adjusting the parts as seen in Figure 2 the measurement between 8 and 7 or between 8 and 6 may be made and with the measurements between the surfaces 5 and 6 formerly ascertained it will be very simple to figure the distance between the surfaces 8 and 5.

Therefore all the measurements above referred to may be accurately made by the use of the attachment which without such a part will be impossible.

The slightly modified form of attachment shown in Figure 6 in which graduations are arranged on the edges of the attachment, the utility of the device as a micrometer will not be enhanced but the measurements equal in accuracy to the steel rule measurements for instance between 5—6 and 12 or between 8—7—6 and 10, may be made.

The improved micrometer attachment also provides a very accurate square.

Having thus described my invention what is claimed and desired to be secured by Letters Patent is:

1. The combination with a depth micrometer having a straight edge member to rest on a surface from which a measurement is to be taken and having a measuring post adjustable to project transversely, of and beyond the straight edge member, of an arm member parallel with the post to cooperate therewith when projected beyond the straight edge member, and means adjustably mounting the arm member for movement on the other member independently of and in a plane transversely of and relatively to the post.

2. The combination with a depth micrometer having a cross arm adapted to rest on a surface from which a measurement is to be made, an arm disposed at an angle to and having interengaging connection with said cross arm whereby it is inseparable therefrom in a plane transversely thereof and is adjustable along the same, a clamping shoe loosely mounted on one of the arms, and means operable to force said clamping shoe into binding contact with the other arm.

3. The combination with a depth micrometer having a straight edge member to rest on a surface from which a measurement is to be taken and having a measuring post adjustable to project transversely of and beyond the straight edge member, of an arm member parallel with the post to cooperate therewith when projected beyond the straight edge member, and means adjustably mounting the arm member for movement on the other member independently of and in a plane transversely of and relatively to the post, and said arm having parallel straight edges to permit its reversal for interchangeable cooperation of either of said edges of said straight edge member.

4. The combination with a depth micrometer having a straight edge member to rest on a surface from which a measurement is to be taken and having a measuring post adjustable to project transversely of and beyond the straight edge member, of an arm member parallel with the post to cooperate therewith when projected beyond the straight edge member, and means adjustably mounting the arm member for movement on the other member independently of and in a plane transversely of and relatively to the post, and comprising interfitting means between the members, said arm having parallel straight edges to permit reversal for interchangeable cooperation of either of said edges with said straight edge member, said arm having a slot, and clamping means operable to engage the first member accessible through said slot.

5. The combination with a depth micrometer having a cross arm adapted to rest on a surface from which a measurement is to be made, of an arm having parallel edges and adapted to be adjustably mounted on and extend at right angles to said micrometer cross arm and having a clamping shoe loosely pivoted in the end thereof and means to force said clamping shoe into contact with the cross arm of the micrometer to clamp said attachment in position.

In testimony whereof I affix my signature in presence of two witnesses.

ANDREW RUDNAY.

Witnesses:
PETER N. HANSEN,
GEORGE K. MANTY,